United States Patent
Ohnishi

(10) Patent No.: US 10,389,120 B2
(45) Date of Patent: Aug. 20, 2019

(54) UNINTERRUPTIBLE POWER SUPPLY DEVICE

(71) Applicant: TOSHIBA MITSUBISHI-ELECTRIC INDUSTRIAL SYSTEMS CORPORATION, Chuo-ku (JP)

(72) Inventor: Keisuke Ohnishi, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 77 days.

(21) Appl. No.: 15/568,895

(22) PCT Filed: Jun. 2, 2015

(86) PCT No.: PCT/JP2015/065862
§ 371 (c)(1),
(2) Date: Oct. 24, 2017

(87) PCT Pub. No.: WO2016/194126
PCT Pub. Date: Dec. 8, 2016

(65) Prior Publication Data
US 2018/0102647 A1 Apr. 12, 2018

(51) Int. Cl.
*H02J 7/00* (2006.01)
*H02J 3/00* (2006.01)
(Continued)

(52) U.S. Cl.
CPC .............. *H02J 3/006* (2013.01); *H02J 3/005* (2013.01); *H02J 3/10* (2013.01); *H02J 9/06* (2013.01);
(Continued)

(58) Field of Classification Search
None
See application file for complete search history.

(56) References Cited

U.S. PATENT DOCUMENTS 6,201,371 B1 * 3/2001 Kawabe .................. H02J 9/062
307/66
7,459,803 B2 * 12/2008 Mosman .................. H02J 9/06
307/64
(Continued)

FOREIGN PATENT DOCUMENTS

JP 2010-220339 A 9/2010
KR 10-2004-0042529 A 5/2004

OTHER PUBLICATIONS

International Search Report dated Aug. 4, 2015 in PCT/JP2015/065862, filed on Jun. 2, 2015.
(Continued)

*Primary Examiner* — Lincoln D Donovan
*Assistant Examiner* — Khareem E Almo
(74) *Attorney, Agent, or Firm* — Oblon, McClelland, Maier & Neustadt, L.L.P.

(57) ABSTRACT

An uninterruptible power supply device is basically a device that performs a full-time inverter feeding system using a first semiconductor switch, and when a second semiconductor switch, which is an optional item, is connected in parallel to the first semiconductor switch and a full-time bypass feeding system is selected, serves as a device that performs the full-time bypass feeding system using the second semiconductor switch. This leads to a low device cost compared with the case in which an uninterruptible power supply device employing the full-time inverter feeding system and an uninterruptible power supply device employing the full-time feeding system are designed and manufactured separately.

10 Claims, 6 Drawing Sheets

(51) Int. Cl.
H02J 9/06 (2006.01)
H02J 3/10 (2006.01)
(52) U.S. Cl.
CPC ......... *H02J 9/062* (2013.01); *H02J 2009/068* (2013.01)

(56) References Cited

U.S. PATENT DOCUMENTS

| | | | | |
|---|---|---|---|---|
| 9,219,384 B2* | 12/2015 | Emert | ....................... | H02J 9/06 |
| 2011/0068625 A1* | 3/2011 | Duan | .................. | G06F 11/2015 |
| | | | | 307/29 |
| 2016/0111918 A1* | 4/2016 | Benson | ..................... | H02J 9/00 |
| | | | | 307/23 |
| 2018/0076656 A1* | 3/2018 | Nishimura | ................ | H02J 9/06 |

OTHER PUBLICATIONS

Office Action dated Jan. 8, 2019 in Korean Patent Application No. 10-2017-7036842, 8 pages (with unedited computer generated English translation).

Final Office Action issued in corresponding Korean Application No. 10-2017-7036842 dated May 21, 2019 (with English translation).

* cited by examiner

UNINTERRUPTIBLE POWER SUPPLY DEVICE

TECHNICAL FIELD

The present invention relates to uninterruptible power supply devices, and particularly, to an uninterruptible power supply device capable of continuously supplying AC power to a load even in case of a power failure.

BACKGROUND ART

A conventional uninterruptible power supply device includes a converter, an inverter, and a bypass circuit. In normal times in which AC power is supplied normally from an AC power supply, AC power supplied from the AC power supply is converted into DC power by the converter, and then, the DC power is stored in a power storage device and is also converted into AC power by the inverter, and the AC power is supplied to a load. If the inverter has failed, the AC power from the AC power supply is supplied via the bypass circuit to the load. In a power failure in which a supply of the AC power from the AC power supply is stopped, the DC power of the power storage device is converted into AC power by the inverter, and the AC power is supplied to the load (for example, see Japanese Patent Laying-Open No. 2010-220339 (Patent Document 1)).

CITATION LIST

Patent Documents

PTD 1: Japanese Patent Laying-Open No. 2010-220339

SUMMARY OF INVENTION

Technical Problem

The system in which the AC power generated by an inverter is supplied to a load in normal times and, if the inverter has failed, the AC power from an AC power supply is supplied via a bypass circuit to the load is referred to as a full-time inverter feeding system. This system has an advantage that high-quality AC power with small voltage fluctuations which is generated by an inverter can be supplied to a load and a disadvantage that efficiency is low due to a power loss constantly caused in the inverter.

Another system is a full-time bypass feeding system in which the AC power from an AC power supply is supplied via a bypass circuit to a load in normal times and the AC power generated by an inverter is supplied to the load in a power failure. This system has an advantage that a power loss is small and efficiency is high and a disadvantage that low-quality AC power having large voltage fluctuations which is supplied from the AC power supply is constantly supplied to the load.

Users who emphasize the quality of the AC power to be supplied to a load rather than power efficiency want an uninterruptible power supply device employing the full-time inverter feeding system, and users who emphasize power efficiency rather than the quality of the AC power to be supplied to a load want an uninterruptible power supply device employing the full-time bypass feeding system. However, it is costly to separately design and manufacture an uninterruptible power supply device employing the full-time inverter feeding system and an uninterruptible power supply device employing the full-time bypass feeding system.

A primary object of the present invention is therefore to provide a low-cost uninterruptible power supply device.

Solution to Problem

An uninterruptible power supply device according to the present invention includes a first input terminal configured to receive first AC power supplied from a first AC power supply, a second input terminal configured to receive second AC power supplied from a second AC power supply, a battery terminal to be connected to a power storage device, an output terminal to be connected to a load, a converter connected to the first input terminal and configured to convert the first AC power into DC power, an inverter configured to convert the DC power generated by the converter or DC power of the power storage device into third AC power, a first semiconductor switch connected between the second input terminal and the output terminal, a first mechanical switch connected in parallel to the first semiconductor switch, and a controller configured to control the uninterruptible power supply device in a feeding system selected from a first feeding system and a second feeding system. The second feeding system is selectable only when a second semiconductor switch is connected in parallel to the first semiconductor switch. The first feeding system is a feeding system in which when the inverter is normal, the third AC power generated by the inverter is supplied to the load, and when the inverter has failed, the second AC power supplied from the second AC power is supplied via the first semiconductor switch to the load for a predetermined time, and the second AC power is supplied via the first mechanical switch to the load. The second feeding system is a feeding system in which when the second AC power is supplied normally from the second AC power supply, the second AC power is supplied via the second semiconductor switch to the load, and when a supply of the second AC power from the second AC power supply is stopped, the second semiconductor switch is turned off, and the third AC power generated by the inverter is supplied to the load.

Advantageous Effects of Invention

The uninterruptible power supply device according to the present invention is basically a device that performs the first feeding system using the first semiconductor switch, and when the second semiconductor switch is connected in parallel to the first semiconductor switch and the second feeding system is selected, serves as a device that performs the second feeding system using the second semiconductor switch. This leads to a low device cost compared with the case in which an uninterruptible power supply device employing the first feeding system and an uninterruptible power supply device employing the second feeding system are designed and manufactured separately.

DESCRIPTION OF EMBODIMENTS

Figure 1:
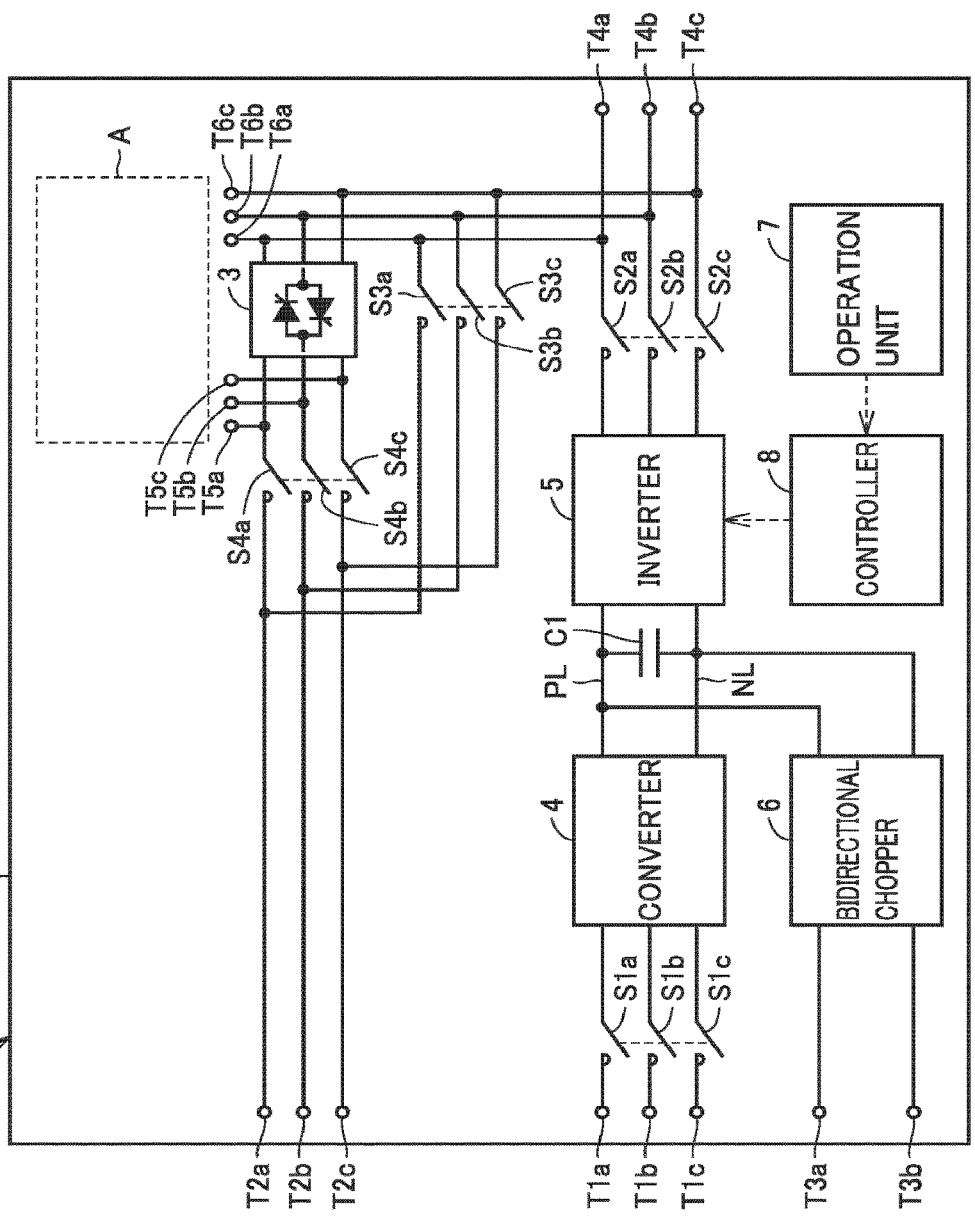
FIG. 1 is a circuit block diagram illustrating a configuration of an uninterruptible power supply device according to an embodiment of the present invention.

FIG. 1 is a circuit block diagram illustrating a configuration of an uninterruptible power supply device 1 according to an embodiment of the present invention. FIG. 1 illustrates a state in which only a semiconductor switch 3 (first semiconductor switch), which is a standard item, is mounted, and a semiconductor switch 20 (second semiconductor switch), which is an optional item, is not mounted.

With reference to FIG. 1, uninterruptible power supply device 1 includes a substrate 2. Input terminals (first input terminals) T1a to T1c, bypass terminals (second input terminals) T2a to T2c, battery terminals T3a and T3b, output terminals T4a to T4c, switch terminals T5a to T5c and T6a to T6c, mechanical switches S1a to S1c, S2a to S2c, S3a to S3c, and S4a to S4c, semiconductor switch 3, a converter 4, a DC positive bus PL, a DC negative bus NL, a capacitor C1, an inverter 5, a bidirectional chopper 6, an operation unit 7, and a controller 8 are mounted on the surface of substrate 2. In the vicinity of switch terminals T5a to T5c and T6a to T6c on the surface of substrate 2, a space A for mounting semiconductor switch 20, which is an optional item, is provided.

Figure 2:
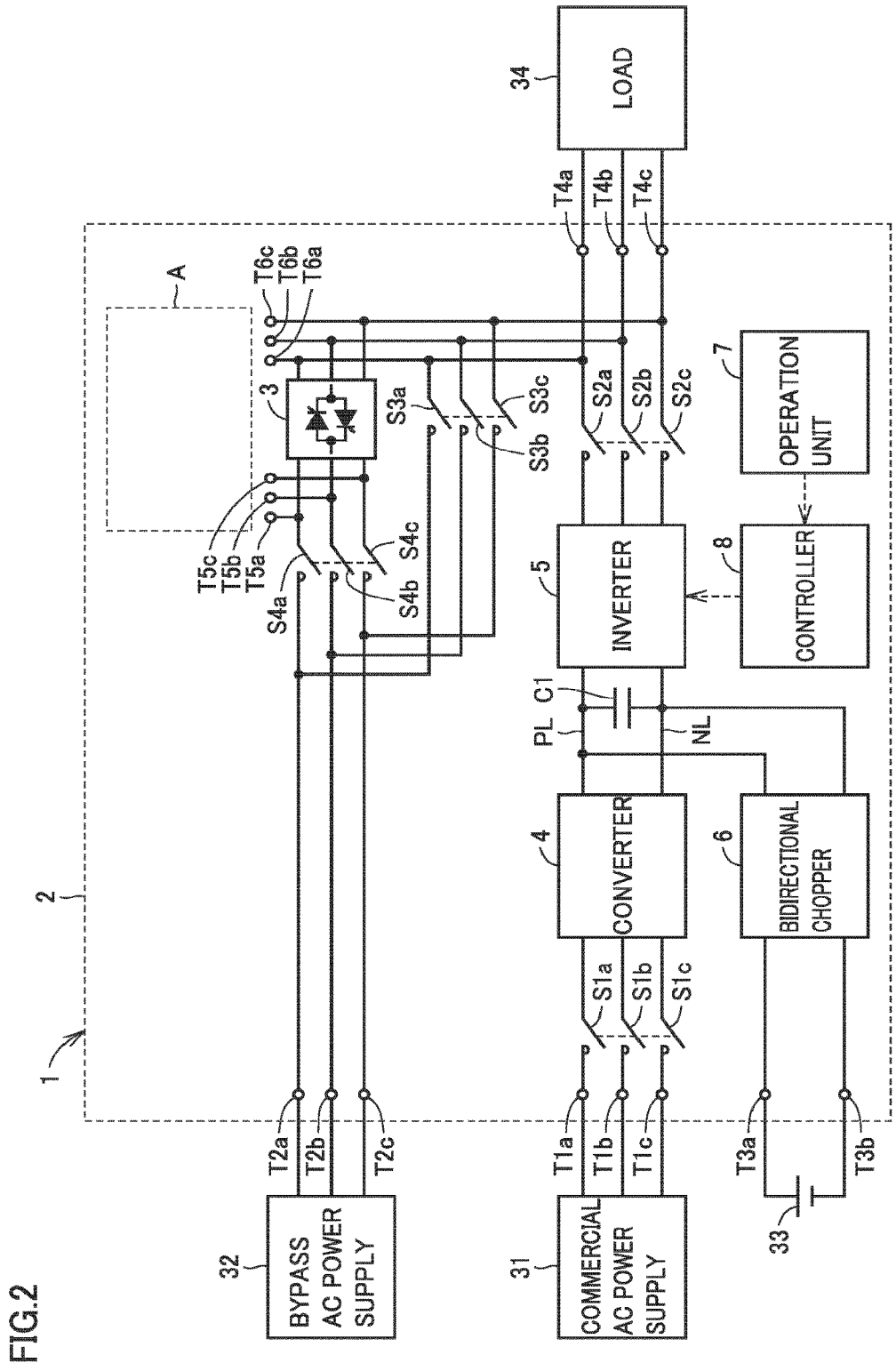
FIG. 2 is a circuit block diagram for describing how to use the uninterruptible power supply device illustrated in FIG. 1 and an operation thereof.

FIG. 2 is a circuit block diagram for describing how to use uninterruptible power supply device 1 illustrated in FIG. 1 and an operation thereof. As illustrated in FIG. 2, input terminals T1a to T1c receive three-phase AC power having a commercial frequency which is supplied from a commercial AC power supply 31 (first AC power supply). Bypass terminals T2a to T2c receive three-phase AC power having the commercial frequency which is supplied from a bypass AC power supply 32 (second AC power supply). Bypass AC power supply 32 can be a commercial AC power supply or a generator.

Battery terminals T3a and T3b are respectively connected to a cathode and an anode of a battery 33 (power storage device). A capacitor can be connected in place of battery 33. Output terminals T4a to T4c are connected to a load 34. Load 34 is driven by the three-phase AC power having the commercial frequency which is supplied from uninterruptible power supply device 1. Semiconductor switch 20, which is an optional item, is connected to switch terminals T5a to T5c and T6a to T6c. This will be described below.

Mechanical switches S1a to S1c have first terminals respectively connected to input terminals T1a to T1c and second terminals connected to three respective input nodes of the converter. Mechanical switches S1a to S1c are controlled by controller 8 to be turned on when converter 4 generates DC power and to be turned off when the operation of converter 4 is stopped, for example, in a power failure in which a supply of the three-phase AC power from commercial AC power supply 31 is stopped.

Converter 4 is controlled by controller 8 to convert the three-phase AC power supplied from commercial AC power supply 31 via mechanical switches S1a to S1c into DC power in normal times in which three-phase AC power is supplied from commercial AC power supply 31.

In other words, in normal times, converter 4 converts a three-phase AC voltage supplied from commercial AC power supply 31 via mechanical switches S1a to S1c to the three input nodes into a DC voltage and outputs the DC voltage to between two output nodes. The operation of converter 4 is stopped in a power failure in which a supply of the three-phase AC power from commercial AC power supply 31 is stopped.

DC positive bus PL and DC negative bus NL have first terminals connected to two respective output nodes of converter 4 and second terminals connected to two respective input nodes of inverter 5. Capacitor C1 is connected between DC positive bus PL and DC negative bus NL and smoothes a DC voltage between DC positive bus PL and DC negative bus NL. The DC power generated by converter 4 is supplied via DC positive bus PL and DC negative bus NL to inverter 5 and is also supplied to bidirectional chopper 6.

Bidirectional chopper 6 is connected to DC positive bus PL and DC negative bus NL and is also connected to battery terminals T3a and T3b. Bidirectional chopper 6 is controlled by controller 8 to supply the DC power generated by converter 4 to battery 33 in normal times in which three-phase AC power is supplied from commercial AC power supply 31 and to supply the DC power of battery 33 to inverter 5 in a power failure in which a supply of the three-phase AC power from commercial AC power supply 31 is stopped.

In other words, bidirectional chopper 6 steps down the DC voltage generated by converter 4 and supplies it to battery 33 in normal times and steps up a voltage between the terminals of battery 33 and supplies it to inverter 5 in a power failure.

Inverter 5 is controlled by controller 8 to convert the DC power generated by converter 4 into three-phase AC power having the commercial frequency in normal times in which three-phase AC power is supplied from commercial AC power supply 31 and to convert the DC power supplied from battery 33 via bidirectional chopper 6 into three-phase AC power having the commercial frequency in a power failure in which a supply of the three-phase AC power from commercial AC power supply 31 is stopped.

In other words, in normal times, inverter 5 generates a three-phase AC voltage having the commercial frequency based on a DC voltage provided to between the two input nodes from converter 4 and outputs the generated three-phase AC voltage to three respective output nodes. In a power failure, inverter 5 generates a three-phase AC voltage having the commercial frequency based on the DC voltage provided to between the two input nodes from battery 33 via bidirectional chopper 6 and outputs the generated three-phase AC voltage to the three respective output nodes.

Mechanical switches (second mechanical switches) S2a to S2c have first terminals connected to the three respective output nodes of inverter 5 and second terminals respectively connected to output terminals T4a to T4c. Mechanical switches S2a to S2c are controlled by controller 8 to be turned on when the AC power generated by inverter 5 is supplied to load 34 and to be turned off when a supply of the AC power generated by inverter 5 to load 34 is stopped and when inverter 5 has failed.

Mechanical switches (first mechanical switches) S3a to S3c have first terminals respectively connected to bypass terminals T2a to T2c and second terminals respectively connected to output terminals T4a to T4c. Mechanical switches S3a to S3c are controlled by controller 8 to be turned on when the three-phase AC power from bypass AC power supply 32 is supplied to load 34, for example, when inverter 5 has failed, and to be turned off when the three-phase AC power from bypass AC power supply 32 is not supplied to load 34.

Mechanical switches S4a to S4c have first terminals respectively connected to bypass terminals T2a to T2c and second terminals connected to three respective input nodes of semiconductor switch 3. Mechanical switches S4a to S4c are controlled by controller 8 to be turned on in normal times and to be turned off, for example, at the time of maintenance of semiconductor switch 3.

Three respective output nodes of semiconductor switch 3 are connected to output terminals T4a to T4c. Semiconductor switch 3 is controlled by controller 8 to be turned off in normal times and to be turned on for a predetermined time Tb when inverter 5 has failed. For lower cost, a semiconductor switch 3 having a rated current value smaller than the rated current value of uninterruptible power supply device 1 is used. Thus, a load current is not allowed to flow constantly through semiconductor switch 3. The rated current values of mechanical switches S1a to S1c, S2a to S2c, S3a to S3c, and S4a to S4c are much greater than the rated current value of semiconductor switch 3. A load current is thus allowed to flow constantly through mechanical switches S2a to S2c and S3a to S3c.

Figure 3:
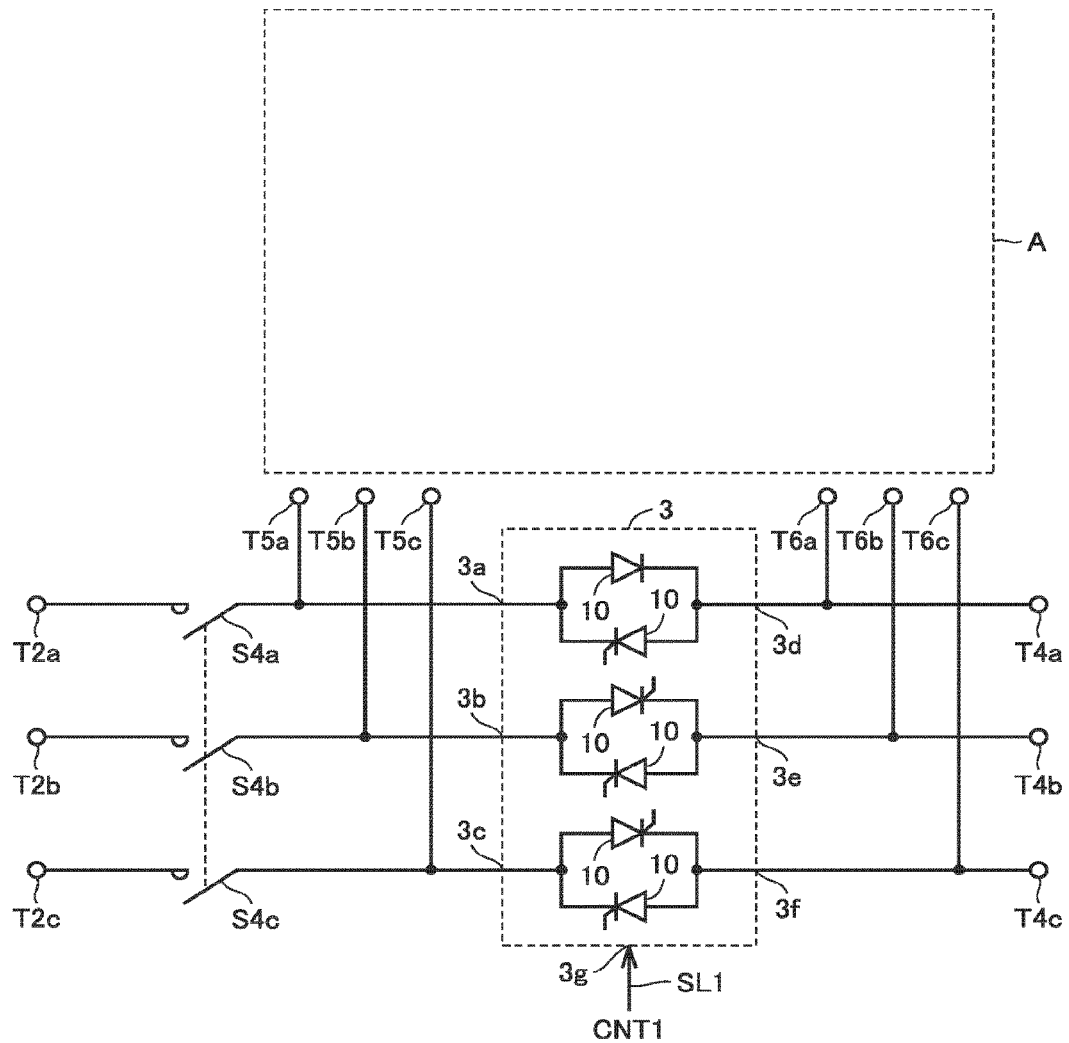
FIG. 3 is a circuit diagram illustrating a configuration of a semiconductor switch 3 illustrated in FIG. 2.

As illustrated in FIG. 3, semiconductor switch 3 includes six thyristors 10. Three thyristors 10 of the six thyristors 10 have anodes, each of which is connected to a corresponding one of the three input nodes 3a to 3c, and cathodes, each of which is connected to a corresponding one of the three output nodes 3d to 3f. The other three thyristors 10 have anodes, each of which is connected to a corresponding one of the three output nodes 3d to 3f, and cathodes, each of which is connected to a corresponding one of the three input nodes 3a to 3c.

A control terminal 3g of semiconductor switch 3 receives a control signal CNT1 from controller 8 through a signal line SL1. Control signal CNT1 is brought to "L" level that is a deactivation level in normal times, and when inverter 5 has failed, is brought to "H" level that is an activation level only for a predetermined period Tb. Each thyristor 10 is turned off when control signal CNT1 is at "L" level. Each thyristor 10 is turned on when control signal CNT1 is brought to "H" level and a forward-bias voltage is applied. An insulated gate bipolar transistor (IGBT) can be provided in place of thyristor 10.

Three input nodes 3a to 3c of semiconductor switch 3 are respectively connected to switch terminals T5a to T5c, and three output nodes 3d to 3f of the semiconductor switch are respectively connected to switch terminals T6a to T6c. Switch terminals T5a to T5c and T6a to T6c will be described below.

Operation unit 7 includes a button, a switch, and the like. A user of uninterruptible power supply device 1 can operate operation unit 7 to, for example, select any one system from among a full-time inverter feeding system (first feeding system) and a full-time bypass feeding system (second feeding system), instruct a start and a stop of an automatic operation of uninterruptible power supply device 1, and instruct a start and a stop of a manual operation of uninterruptible power supply device 1. Operation unit 7 outputs a signal indicative of the result of the operation to controller 8.

Controller 8 controls the whole of uninterruptible power supply device 1 based on a signal from operation unit 7, an instantaneous value of a three-phase AC voltage supplied from commercial AC power supply 31, an instantaneous value of a three-phase AC voltage supplied from bypass AC power supply 32, an instantaneous value of a voltage between the terminals of battery 33, an instantaneous value of a voltage between the terminals of capacitor C1, an instantaneous value of a voltage of each of output terminals T4a to T4c, an instantaneous value of a load current, or the like.

Description will now be given of an operation of uninterruptible power supply device 1 in which a semiconductor switch 20, being an optional item, is not mounted and the full-time inverter feeding system is selected. It is assumed that a user of uninterruptible power supply device 1 has selected the full-time inverter feeding system from among the full-time inverter feeding system and the full-time bypass feeding system using operation unit 7. If a semiconductor switch 20, which is an optional item, is not mounted, the full-time bypass feeding system cannot be selected.

A configuration may be made such that in the case where a semiconductor switch 20, which is an optional item, is not mounted, the full-time inverter feeding system is selected automatically without the need to select a system using operation unit 7. For example, if a signal line SL2 (see FIG. 6) for semiconductor switch 20 is not connected, controller 8 determines that semiconductor switch 20 is not mounted and performs full-time inverter feeding. If no semiconductor switch 20 is mounted, the full-time inverter feeding system can be invariably selected at shipment.

In normal times in which three-phase AC power is normally supplied from AC power supply 31, mechanical switches S1a to S1c, S2a to S2c, and S4a to S4c are turned on, and mechanical switches S3a to S3c and semiconductor switch 3 are turned off. The three-phase AC power supplied from commercial AC power supply 31 is converted into DC power by converter 4. The DC power generated by converter 4 is stored in battery 33 via bidirectional chopper 6 and is also converted into three-phase AC power having the commercial frequency by inverter 5, and the three-phase AC power is supplied to load 34.

When inverter 5 has failed in normal times, semiconductor switch 3 and mechanical switches S3a to S3c are turned on and mechanical switches S2a to S2c are turned off, and after a lapse of predetermined time Tb, semiconductor switch 3 is turned off. Consequently, the three-phase AC power from bypass AC power supply 32 is supplied via mechanical switches S3a to S3c to load 34, so that an operation of load 34 can be continued.

In a power failure in which a supply of the three-phase AC power from commercial AC power supply 31 is stopped, mechanical switches S1a to S1c are turned off and the operation of converter 4 is stopped, and DC power of battery 33 is supplied via bidirectional chopper 6 to inverter 5, and is then converted into three-phase AC power having the commercial frequency, and the three-phase AC power is supplied to load 34. Even in case of a power failure, thus, the operation of load 34 can be continued during a period in which DC power is stored in battery 33.

Figure 4:
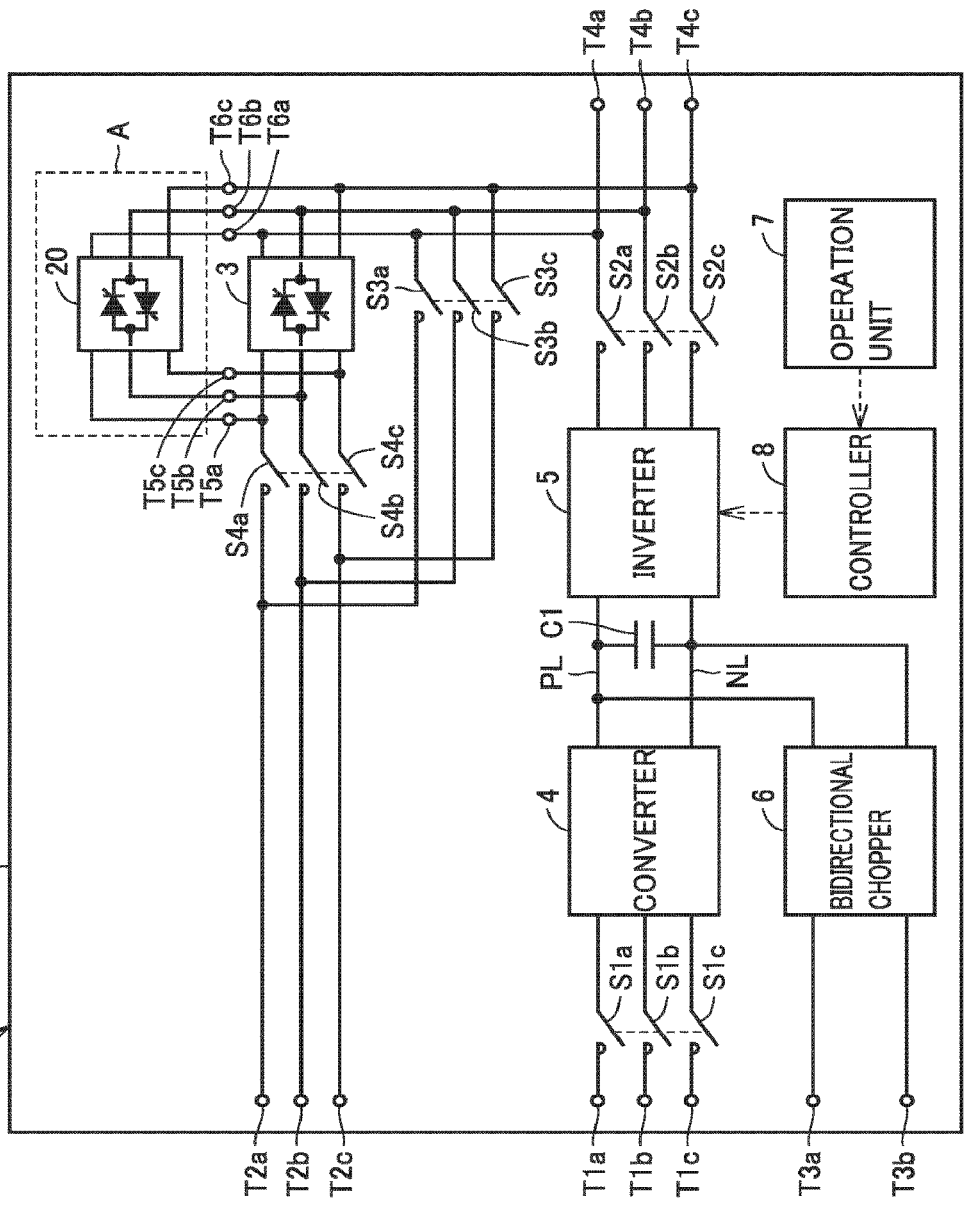
FIG. 4 is a circuit block diagram illustrating a configuration of an uninterruptible power supply device in which a semiconductor switch 20 is mounted.
Figure 5:
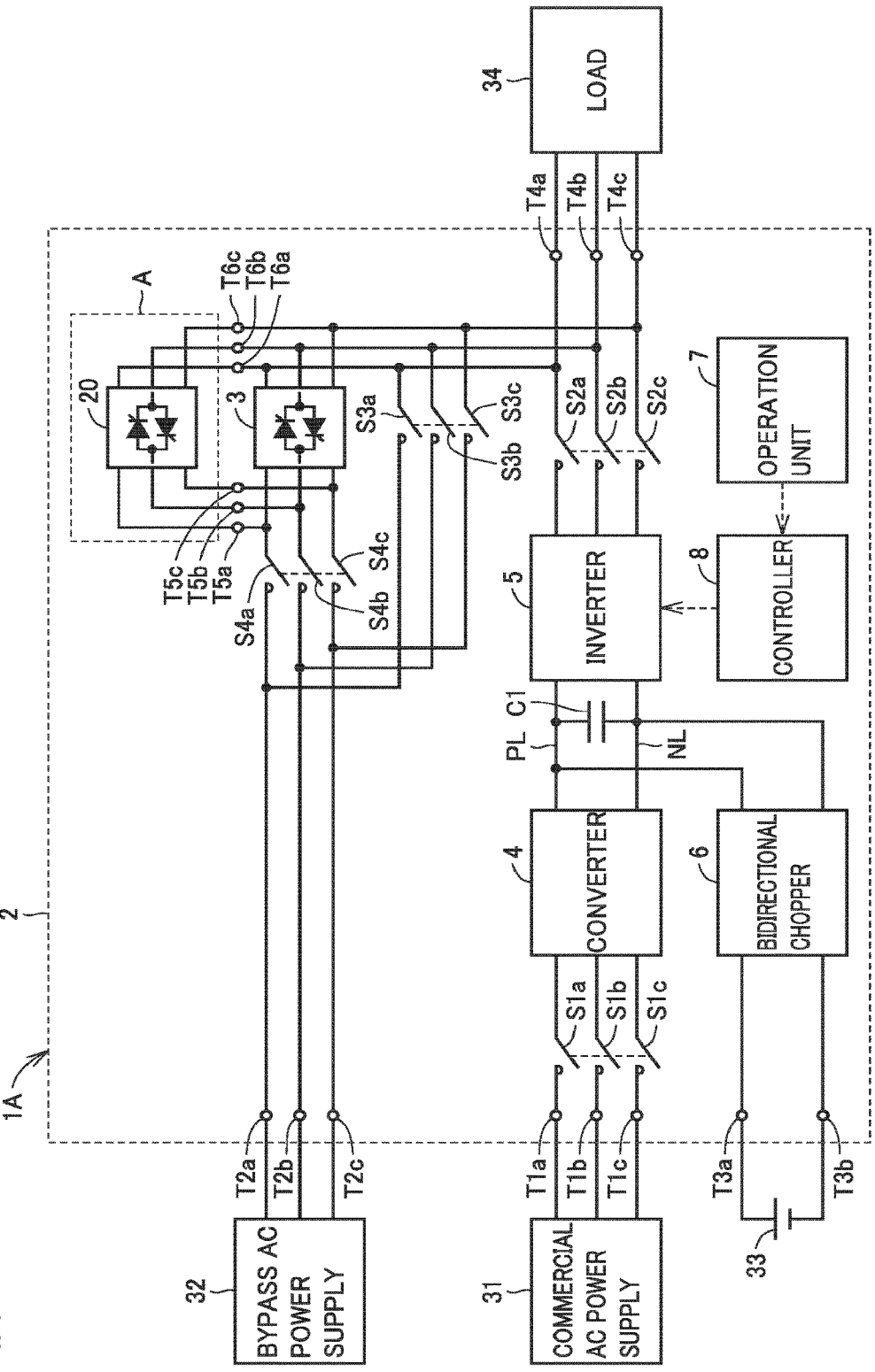
FIG. 5 is a circuit block diagram for describing how to use the uninterruptible power supply device illustrated in FIG. 4 and an operation thereof.
Figure 6:
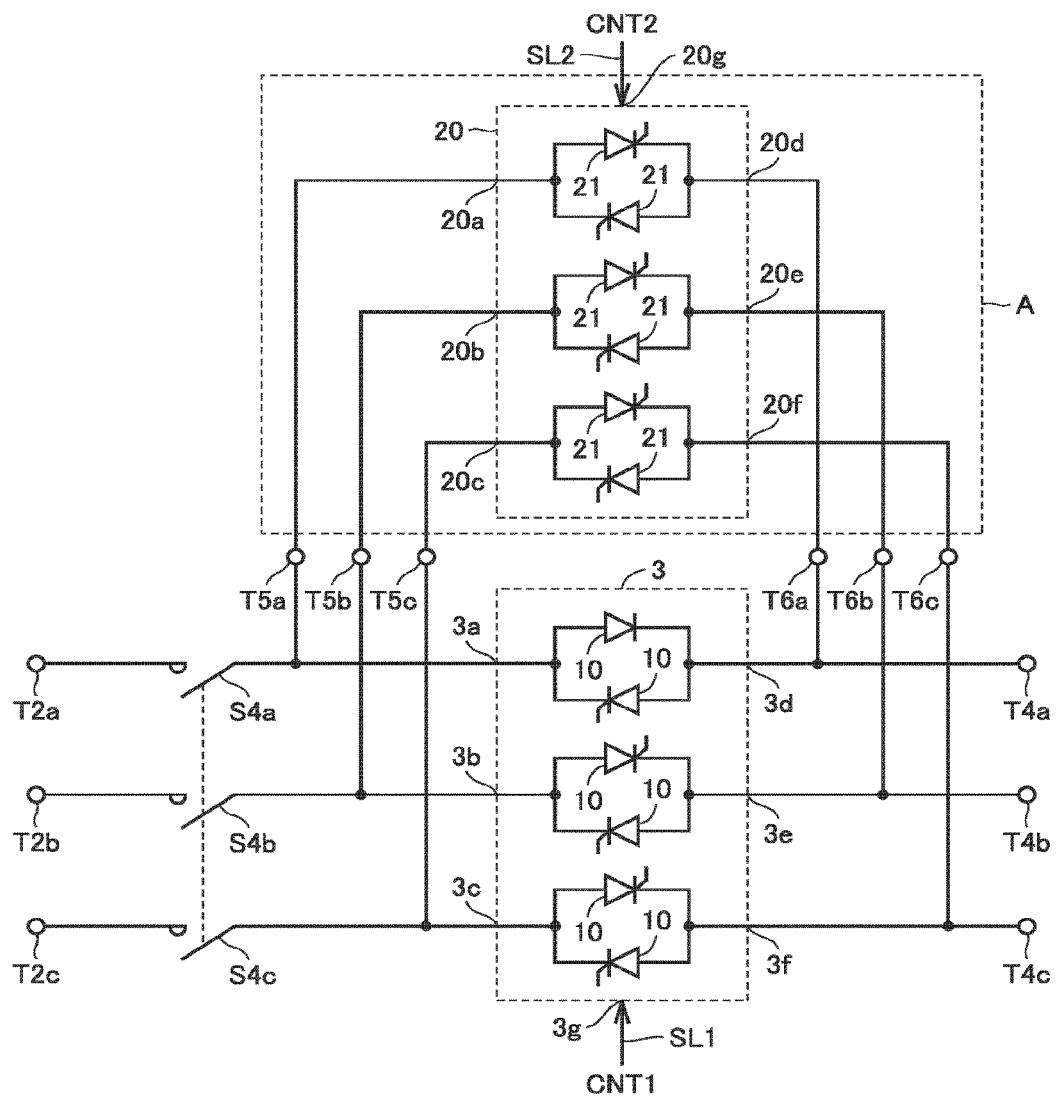
FIG. 6 is a circuit diagram illustrating a configuration of the semiconductor switch 20 illustrated in FIG. 4.

Description will now be given of a case in which semiconductor switch 20, which is an optional item, is mounted in uninterruptible power supply device 1. FIG. 4 is a circuit block diagram illustrating a configuration of an uninterruptible power supply device 1A in which a semiconductor switch 20, which is an optional item, is mounted, and is compared with FIG. 1. FIG. 5 is a circuit block diagram for describing how to use uninterruptible power supply device 1A illustrated in FIG. 4 and an operation thereof, and is compared with FIG. 2. FIG. 6 is a circuit diagram illustrating a configuration of semiconductor switch 20, and is compared with FIG. 3.

With reference to FIGS. 4 to 6, a semiconductor switch 20, which is an optional item, is arranged in a space A and is secured to uninterruptible power supply device 1A with, for example, a plurality of screws. Since a current is constantly passed through semiconductor switch 20, a finned cooler for dissipating the heat generated in semiconductor switch 20 and a fan for blowing air to the cooler may be provided.

Three input nodes 20a to 20c of semiconductor switch 20 are respectively connected to switch terminals T5a to T5c, and three output nodes 20d to 20f of semiconductor switch 20 are respectively connected to switch terminals T6a to T6c. For example, six wiring lines have first ends, each of which is screwed to a corresponding one of nodes 20a to 20f of semiconductor switch 20 and second ends, each of which is screwed to a corresponding one of switch terminals T5a to T5c and T6a to T6c.

Alternatively, connectors provided at the first ends of the six wiring lines can be detachably connected with connectors provided to nodes 20a to 20f of semiconductor switch 20, and connectors provided at second ends thereof can be detachably connected with connectors provided to switch terminals T5a to T5c and T6a to T6c.

A control terminal 20g of semiconductor switch 20 is connected via signal line SL2 to a control terminal (not shown) of controller 8. For example, signal line SL2 has a first end screwed to control terminal 20g and a second end screwed to controller 8. Alternatively, a connector provided at the first end of signal line SL2 is detachably connected with a connector provided at control terminal 20g, and a connector provided at the second end thereof is detachably connected to a connector provided at controller 8. As described above, semiconductor switch 20 is detachably provided to substrate 2.

As illustrated in FIG. 6, semiconductor switch 20 includes six thyristors 21. Three thyristors 21 of the six thyristors 21 have anodes, each of which is connected to a corresponding one of the three input nodes 20a to 20c, and cathodes, each of which is connected to a corresponding one of the three output nodes 20d to 20f. The other three thyristors 21 have anodes, each of which is connected to a corresponding one of the three output nodes 20d to 20f, and cathodes, each of which is connected to a corresponding one of the three input nodes 20a to 20c.

Control terminal 20g of semiconductor switch 20 receives a control signal CNT2 from controller 8 through a signal line SL2. Control signal CNT2 is brought to "H" level that is an activation level in normal times in which three-phase AC power is supplied from AC power supplies 31 and 32 and is brought to "L" level that is a deactivation level in a power failure in which a supply of the three-phase AC power from AC power supplies 31 and 32 is stopped. When control signal CNT2 is at "L" level, each thyristor 21 is turned off. Each thyristor 21 is turned on when control signal CNT2 is brought to "H" level and a forward bias voltage is applied. An IGBT can be provided in place of thyristor 21.

Since a load current is constantly caused to flow through semiconductor switch 20, a semiconductor switch 20 having a rated current value not smaller than the rated current value of uninterruptible power supply device 1A is used. The rated current value of semiconductor switch 20 is accordingly greater than the rated current value of semiconductor switch 3.

An uninterruptible power supply device 1A in which a semiconductor switch 20, being an optional item, is mounted is basically used as an uninterruptible power supply device employing the full-time bypass feeding system. A user of uninterruptible power supply device 1A selects the full-time bypass feeding system using operation unit 7. It should be noted that even when a semiconductor switch 20 is mounted, the full-time inverter feeding system can be selected using operation unit 7. Controller 8 controls uninterruptible power supply device 1A in response to a signal from operation unit 7.

A configuration may be made such that in the case where a semiconductor switch 20, which is an optional item, is mounted, the full-time bypass feeding system is automatically selected without the need to select a system using operation unit 7. For example, controller 8 determines that a semiconductor switch 20 is mounted and performs full-time bypass feeding when signal line SL2 is connected, and determines that no semiconductor switch 20 is mounted and performs full-time inverter feeding when signal line SL2 is not connected.

It is assumed here that a user of uninterruptible power supply device 1A has selected the full-time bypass feeding system using operation unit 7 and that a commercial AC power supply 31 is used as bypass AC power supply 32. With reference to FIG. 5, in uninterruptible power supply device 1A in which a semiconductor switch 20 is mounted and the full-time bypass feeding system is selected, mechanical switches S1a to S1c are controlled by controller 8 to be turned on when DC power is generated by converter 4 and to be turned off when the operation of converter 4 is stopped, for example, in a power failure in which a supply of the three-phase AC power from AC power supplies 31 and 32 is stopped.

Converter 4 is controlled by controller 8 to convert the three-phase AC power supplied from AC power supply 31 via mechanical switches S1a to S1c into DC power in normal times in which three-phase AC power is supplied from AC power supplies 31 and 32 and to stop operating in a power failure in which a supply of the three-phase AC power from AC power supplies 31 and 32 is stopped.

Bidirectional chopper 6 is controlled by controller 8 to supply the DC power generated by converter 4 to battery 33 in normal times in which three-phase AC power is supplied from AC power supplies 31 and 32 and to supply the DC power of battery 33 to inverter 5 in a power failure in which a supply of the three-phase AC power from AC power supplies 31 and 32 is stopped.

Inverter 5 is controlled by controller 8 to stop operating in normal times in which three-phase AC power is supplied from AC power supplies 31 and 32 and to convert the DC power supplied from battery 33 via bidirectional chopper 6 into three-phase AC power having a commercial frequency in a power failure in which a supply of the three-phase AC power from AC power supplies 31 and 32 is stopped.

Mechanical switches S2a to S2c are controlled by controller 8 to be turned on when the DC power generated by inverter 5 is supplied to load 34 and to be turned off when a supply of the DC power generated by inverter 5 to load 34 is stopped and when inverter 5 has failed.

Mechanical switches S3a to S3c are controlled by controller 8 to be turned on when both semiconductor switch 20 and inverter 5 have failed in normal times in which three-phase AC power is supplied from AC power supplies 31 and 32 and to be turned off in any other period. Mechanical switches S4a to S4c are controlled by controller 8 to be turned on in normal times and to be turned off, for example, at the time of maintenance of semiconductor switch 3, 20.

Semiconductor switch 3 is controlled by controller 8 to be turned on for only a predetermined time Tb when both semiconductor switch 20 and inverter 5 have failed in normal times in which three-phase AC power is supplied from AC power supplies 31 and 32 and to be turned off in any other period.

Description will now be given of an operation of uninterruptible power supply device 1A in which a semiconductor switch 20, being an optional item, is mounted and the full-time bypass feeding system is selected. In normal times in which three-phase AC power is supplied normally from AC power supplies 31 and 32, mechanical switches S1a to S1c and S4a to S4c and semiconductor switch 20 are turned on, and mechanical switches S2a to S2c and S3a to S3c and semiconductor switch 3 are turned off.

The three-phase AC power supplied from bypass AC power supply 32 is supplied via mechanical switches S4a to S4c and semiconductor switch 20 to load 34, so that load 34 is operated. The three-phase AC power supplied from commercial AC power supply 31 is converted into DC power by converter 4 and is stored in battery 33 via bidirectional chopper 6. Inverter 5 is brought to the standby state.

When semiconductor switch 20 has failed and is turned off in normal times, mechanical switches S2a to S2c are turned on, and the DC power generated by converter 4 is converted into three-phase AC power by inverter 5, and the three-phase AC power is supplied to load 34 via mechanical switches S2a to S2c, so that the operation of load 34 is continued. When inverter 5 has failed further, semiconductor switch 3 and mechanical switches S3a to S3c are turned on and mechanical switches S2a to S2c are turned off, and after a lapse of a predetermined time Tb, semiconductor switch 3 is turned off. Consequently, the three-phase AC power from bypass AC power supply 32 is supplied via mechanical switches S3a to S3c to load 34, so that the operation of load 34 is continued.

In a power failure in which a supply of the three-phase AC power from AC power supplies 31 and 32 is stopped, semiconductor switch 20 is turned off, thus electrically separating bypass AC power supply 32 from load 34. Also, mechanical switches S1a to S1c are turned off, and then, the operation of converter 4 is stopped. Further, mechanical switches S2a to S2c are turned on, so that the DC power of battery 33 is supplied via bidirectional chopper 6 to inverter 5 and is converted by inverter 5 into three-phase AC power having the commercial frequency and the three-phase AC power is supplied to load 34. Even in case of a power failure, the operation of load 34 can be continued during a period in which DC power is stored in battery 33.

If the full-time inverter feeding system is selected when a semiconductor switch 20, which is an optional item, is mounted, semiconductor switch 20 is fixed at OFF state. Since the other operation is the same as that when no semiconductor switch 20 is mounted and the full-time inverter feeding system is selected, its description will not be repeated.

As described above, in the present embodiment, an uninterruptible power supply device 1 in which no semiconductor switch 20, being an optional item, is mounted is shipped as an uninterruptible power supply device employing the full-time inverter feeding system which is shipped in high volume. A semiconductor switch 20 is prepared as an optional item in uninterruptible power supply device 1, and a space A in which semiconductor switch 20 is to be arranged and switch terminals T5a to T5c and T6a to T6c to be connected with semiconductor switch 20 are prepared in advance in substrate 2.

An uninterruptible power supply device 1A in which a semiconductor switch 20, being an optional item, is mounted is shipped as an uninterruptible power supply device employing the full-time bypass feeding system which is shipped in low volume. Uninterruptible power supply device 1A is also available as an uninterruptible power supply device employing the full-time inverter feeding system. This leads to a low device cost compared with the case in which an uninterruptible power supply device employing the full-time inverter feeding system and an uninterruptible power supply device employing the full-time feeding system are designed and manufactured separately.

In the present embodiment, when a semiconductor switch 20, which is an optional item, is mounted and the full-time bypass feeding system is selected, a semiconductor switch 20 is turned on and mechanical switches S2a to S2c are turned off in normal times in which three-phase AC power is supplied from AC power supplies 31 and 32. This method, however, requires a little time between a stop of a supply of three-phase AC power from AC power supplies 31 and 32 and a supply of the three-phase AC power generated by inverter 5 via mechanical switches S2a to S2c to load 34.

In normal times, thus, semiconductor switch 20 and mechanical switches S2a to S2c may be turned on, and inverter 5 may be kept in a state of outputting only a three-phase AC voltage and outputting no three-phase AC current. In this case, when a supply of three-phase AC power from AC power supplies 31 and 32 is stopped, three-phase AC power can be supplied immediately from inverter 5 to load 34. In this case, mechanical switches S2a to S2c can be removed further, and the three respective output nodes of inverter 5 can be connected to output terminals T4a to T4c.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST 1, 1A: uninterruptible power supply device; 2: substrate; T1a to T1c: input terminal; T2a to T2c bypass terminal, T3a, T3b: battery terminal; T4a to T4c: output terminal; T5a to T5c, T6a to T6c: switch terminal; S1a to S1c, S2a to S2c, S3a to S3c, S4a to S4c: mechanical switch; 3, 20: semiconductor switch; 4: converter; PL: DC positive bus; NL: DC negative bus; C1: capacitor; 5: inverter; 6: bidirectional chopper; 7: operation unit; 8: controller; 10, 21: thyristor; A: space; 31: commercial AC power supply; 32: bypass AC power supply; 33 load

The invention claimed is:

1. An uninterruptible power supply device comprising:
a first input terminal configured to receive first AC power supplied from a first AC power supply;
a second input terminal configured to receive second AC power supplied from a second AC power supply;
a battery terminal to be connected to a power storage device;
an output terminal to be connected to a load;
a converter connected to the first input terminal and configured to convert the first AC power into DC power;

an inverter configured to convert the DC power generated by the converter or DC power of the power storage device into third AC power;
a first semiconductor switch connected between the second input terminal and the output terminal;
a first mechanical switch connected in parallel to the first semiconductor switch; and
a controller configured to control the uninterruptible power supply device in a feeding system selected from a first feeding system and a second feeding system,
the second feeding system being selectable only when a second semiconductor switch is connected in parallel to the first semiconductor switch,
the first feeding system being a feeding system in which
when the inverter is normal, the third AC power generated by the inverter is supplied to the load, and
when the inverter has failed, the second AC power supplied from the second AC power supply is supplied via the first semiconductor switch to the load for a predetermined time, and the second AC power is supplied via the first mechanical switch to the load,
the second feeding system being a feeding system in which
when the second AC power is supplied normally from the second AC power supply, the second AC power is supplied via the second semiconductor switch to the load, and
when a supply of the second AC power from the second AC power supply is stopped, the second semiconductor switch is turned off, and the third AC power generated by the inverter is supplied to the load.

2. The uninterruptible power supply device according to claim 1, wherein a rated current value of the second semiconductor switch is greater than a rated current value of the first semiconductor switch.

3. The uninterruptible power supply device according to claim 1, wherein the second semiconductor switch is prepared as an optional item for the uninterruptible power supply device.

4. The uninterruptible power supply device according to claim 1, wherein the second semiconductor switch is detachable.

5. The uninterruptible power supply device according to claim 1, wherein a space for installing the second semiconductor switch is prepared.

6. The uninterruptible power supply device according to claim 1, further comprising a first switch terminal and a second switch terminal respectively connected to a first terminal and a second terminal of the first semiconductor switch,
wherein the second semiconductor switch is connected between the first and second switch terminals.

7. The uninterruptible power supply device according to claim 1, further comprising the second semiconductor switch connected in parallel to the first semiconductor switch.

8. The uninterruptible power supply device according to claim 1, wherein the second feeding system is a feeding system in which in a case where the second AC power is supplied normally from the second AC power supply,
when the second semiconductor switch has failed and does not turn on, the third AC power generated by the inverter is supplied to the load, and
when the inverter has failed further, the first mechanical switch is turned on, and the second AC power is supplied via the first mechanical switch to the load.

9. The uninterruptible power supply device according to claim 1, further comprising a second mechanical switch connected between an output node of the inverter and the output terminal,
wherein in a case where the first feeding system is selected,
when the inverter is normal, the second mechanical switch is turned on, and
when the inverter has failed, the second mechanical switch is turned off, and
wherein in a case where the second feeding system is selected,
when the second AC power is supplied normally from the second AC power supply, the second mechanical switch is turned off, and
when a supply of the second AC power from the second AC power supply is stopped, the second mechanical switch is turned on.

10. The uninterruptible power supply device according to claim 1, further comprising a bidirectional chopper configured to
supply the DC power generated by the converter to the power storage device when the first AC power is supplied normally from the first AC power supply, and
supply the DC power of the power storage device to the inverter when a supply of the first AC power from the first AC power supply is stopped.

* * * * *